Aug. 30, 1949.  W. H. CARHART  2,480,548
VEHICLE TIRE
Filed Aug. 2, 1948
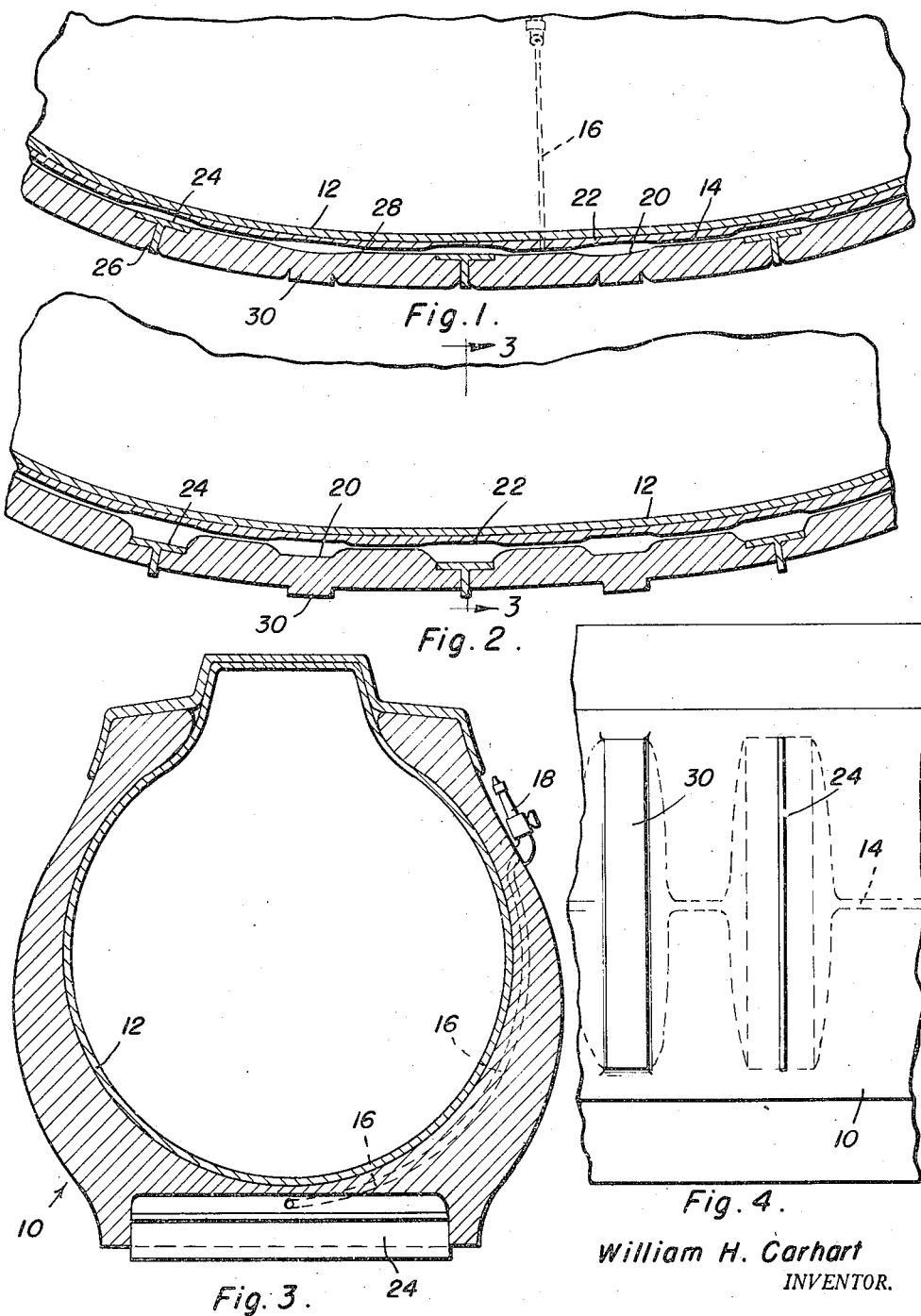
William H. Carhart
INVENTOR.

Patented Aug. 30, 1949

2,480,548

UNITED STATES PATENT OFFICE 2,480,548

VEHICLE TIRE

William H. Carhart, Staten Island, N. Y.

Application August 2, 1948, Serial No. 42,022

3 Claims. (Cl. 152—208)

1

This invention relates to improvements in tires and it is a primary object of the invention to provide a tire that will prevent and stop skidding on slipery and icy surfaces.

An object of the invention is to provide fluid pressure that, upon actuation, will overcome the natural resistance of the tire treads and by expanding the chamber, will obtain the nonskid operation desired.

And another object of the invention is to provide cooperating ice gripping members and skid preventing expanding treads, whereby on pressure from the fluid control means, the tire is expanded to bring into operative relation the gripping members, after which they can be again retracted to inoperative relation.

A further object of the invention is to operate the device manually from the tire or by remote control, such as from the dashboard of a vehicle, either means being adapted to efficiently control the device.

Other objects of the invention reside in the details of construction and in combination of the various parts and in their mode of operation, as will hereinafter appear.

The following is a detailed description of a preferred embodiment of the invention and is illustrated in the accompanying drawings, wherein, Figure 1 is a fragmentary sectional view of the invention before fluid pressure is applied;

Figure 2 is a view similar to Figure 1 and illustrating the invention after fluid pressure has been applied;

Figure 3 is a transverse vertical sectional view and is taken substantially on line 3—3 of Figure 2, and Figure 4 is a fragmentary plan view of the skid preventing structure.

Referring to the figures, and particularly to Figure 3, the tire of the invention is illustrated generally by numeral 10 and is adapted to be fitted together with the usual inner tube 12 for retention on a motor vehicle, in the usual manner.

Referring more specifically to Figures 1, 2, and 4, tire 10 contains an annular channel 14 extending through the periphery thereof between the walls of tire 10. Channel 14 is connected to a fluid supply line 16, in any suitable manner, and fluid supply line 16 is connected to valve 18 on the outer surface thereof. It is to be understood, that the supply of fluid pressure can be modified to be controlled either from adjacent the tire by manual means, or by control means operated from the dash board of the vehicle, not shown.

2

When fluid line 16 is employed in the manner illustrated in dotted lines in the figures, they will either extend transversely in the manner illustrated in Figure 1, suitable reinforcement being supplied, or in the event that a copper fluid line is employed, it will be run diagonally along the tire for proper operation.

At predetermined spaces along the length of channel 14, are oppositely disposed grooves or chambers 20 and 22, these chambers providing pockets for expansion when fluid pressure is supplied, as will presently appear. Alternate grooves 20 retain in seated relation therein ice gripping pins or spikes 24, these spikes being of T-shape, with the head portion thereof being retained in the grooves, while the depending leg portions extend through tire 10 to terminate flush with the outer periphery thereof. Triangular recesses 26 are cut into the outer periphery of tire 10 and extend to a short distance inwardly at the point where the leg portion of spikes 24 terminate on the tire rim.

Slots 28, somewhat similar to recesses 26, but of larger area and extending somewhat further in tire 10 are cut adjacent grooves 20 and retain integrally therein expanding treads 30, treads 30 also terminating flush with the outer periphery of tire 10, as is clearly shown in Figure 1. It will be noted (Figure 4), that spikes 24 and treads 30 extend transversely the width of tire 10.

When in use, fluid pressure, which may be either pneumatic or hydraulic, or any other type desired, is supplied to the vehicle tire, either by manual means at the tire itself or by control from the dashboard. In the event that the device is controlled from the dashboard of the vehicle, it is merely necessary to provide pump means as well as a gage to indicate the pressure being supplied. Pressure would be directed by means of suitable conduits to the rear axle of the vehicle and sealed at the axle by any suitable sealing means, after which it is in turn directed to the tire 10. Such construction is within the realm of a skilled mechanic, and forms no part of the instant invention. When fluid pressure has been supplied to annular channel 14, the enlarged space provided by grooves or chambers 20 and 22 will be filled, causing the outer portion of the tire 10 to expand, and this causes treads 30 and spikes 24 to protrude beyond the outer surface of the tire in the manner illustrated in Figure 2, recesses 26 and slots 28 all being approximately square or in the same plane as the remainder of the outer periphery of the tire. Treads 30 and spikes 24 now engage and grip the surface of the road, treads 30 being particularly effective to stop skidding on wet surfaces by the transverse disposition thereof, and spikes 24 being particularly adapted to pierce icy surfaces.

Chambers 20 and 22 are closed completely when the invention is not in use by pulling a vacuum on the system.

While spikes 24 are shown as of single blade construction, it will be understood that variation thereof may be made, such as a serrated edge, or individual teeth, or any suitable gripping means. Tread 30 may be constructed to extend diagonally across the outer periphery of tire 10 if so desired. The device may also be constructed so that spike means 24 and tread 30 will operate simultaneously or independently of each other. The area where pressure is exerted will be reinforced or weakened in any suitable manner so that pressure will be directed to the parts necessary for the satisfactory operation of the device.

While a preferred embodiment of the invention has been shown and described, it is to be understood that various changes in size, shape and arrangement of parts may be made without departing from the spirit of the invention or the scope of the appended claims.

Having described the invention, what is claimed as new is:

1. A tire consisting of an intermediate annular channel, said channel being adapted to receive fluid under pressure, chambers in said channel, said chambers being in spaced relation, road-gripping means secured in said tire, and means to supply fluid to said channel, said channel being within the walls of said tire, said gripping means comprising spikes seated in said annular channel and extending through the walls thereof to the exterior whereby, upon expansion of the chambers, the spikes are protruded to engage the surface being traveled.

2. The combination of claim 3, wherein said spikes are T-shaped.

3. A tire consisting of an intermediate annular channel, said channel being entirely within the walls of the tire, chambers in said channel, means to supply fluid pressure to said chambers and channel to expand same, recesses in the outer periphery of said tire adjacent said chambers; and road-engaging means in said recesses normally terminating flush with the outer periphery of the tire and expanding on supply of fluid pressure to protrude and engage the surface being travelled to prevent skidding, said road engaging means comprising expanding treads and spikes.

WILLIAM H. CARHART.

No references cited.